United States Patent

[11] 3,625,545

| [72] | Inventors | Howard Somers;<br>Hugh D. Wolcott, both of 6343 Geiser Ave.,<br>Reseda, Calif. 91335 |
|---|---|---|
| [21] | Appl. No. | 41,829 |
| [22] | Filed | June 1, 1970 |
| [45] | Patented | Dec. 7, 1971 |

[54] MOTORCYCLE TRAILER
10 Claims, 18 Drawing Figs.

[52] U.S. Cl. ........................................... 280/400,
280/106 T, 280/490
[51] Int. Cl. ........................................... B62d 53/00
[50] Field of Search ........................................... 280/400,
402, 292, 106 T; 214/505, 506

[56] References Cited
UNITED STATES PATENTS

| 2,661,108 | 12/1953 | Horn et al. | 214/506 |
| 2,988,382 | 6/1961 | Holland | 280/400 |
| 3,025,985 | 3/1962 | Crawford | 214/505 |
| 3,428,332 | 2/1969 | McCance | 280/292 |
| 3,430,983 | 3/1969 | Jones | 280/402 |

FOREIGN PATENTS

| 659,980 | 3/1963 | Canada | 280/400 |

*Primary Examiner*—Leo Friaglia
*Attorney*—Georges A. Maxwell

ABSTRACT: A trailer adapted to be releasably coupled with and towed by a draft vehicle and which is adapted to support and carry one or more motorcycles; the trailer comprising a foldable frame and axle assembly, removable wheel and mudguard assemblies and adjustable trailer hitch means and wheel stop means whereby the trailer can be adjusted to cooperatively receive and support motorcycles of different size, be engaged with draft vehicles with trailer hitch means at different heights and such that the trailer can be easily folded and dismantled for easy and convenient handling and storing when not in use.

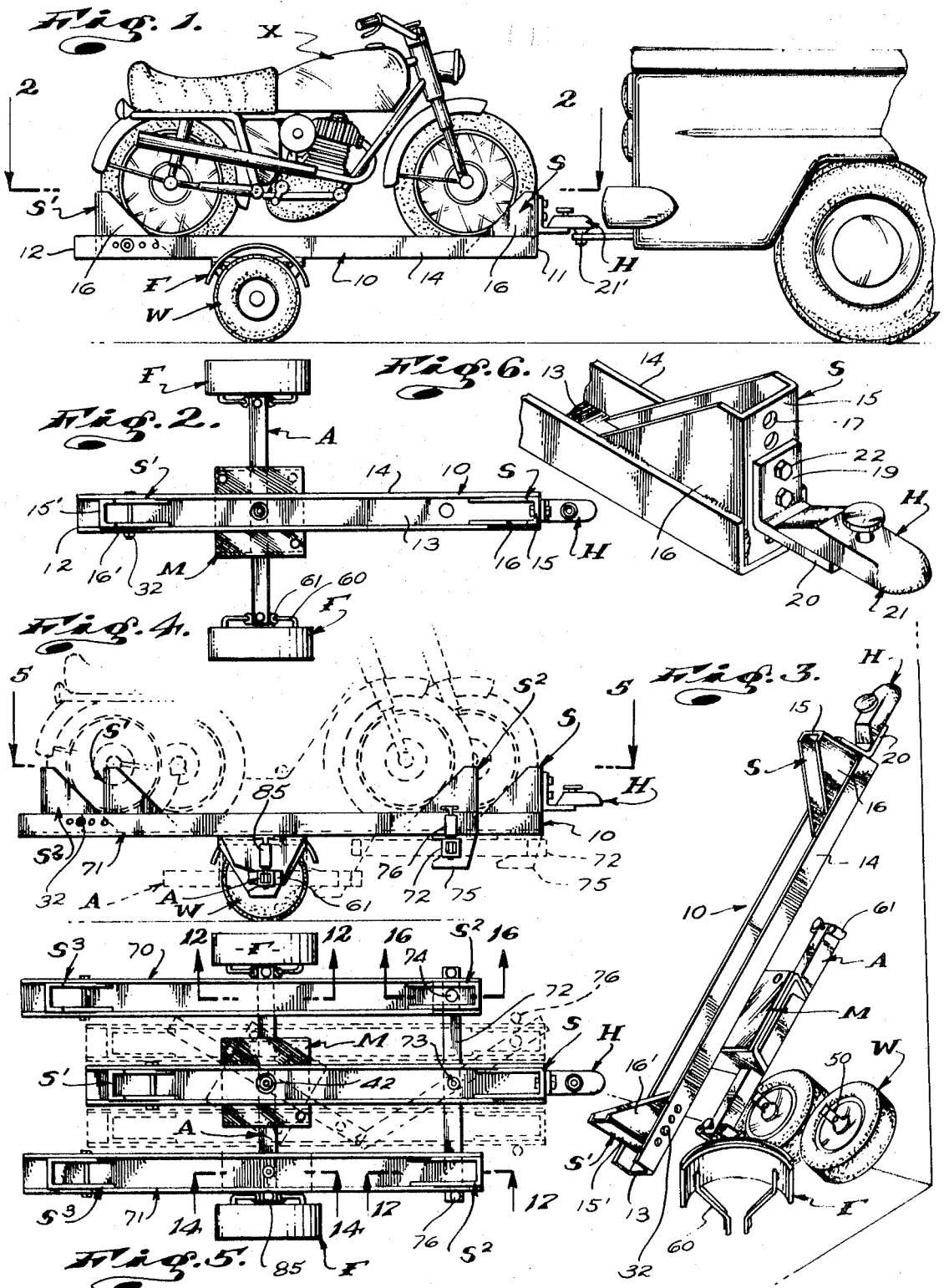

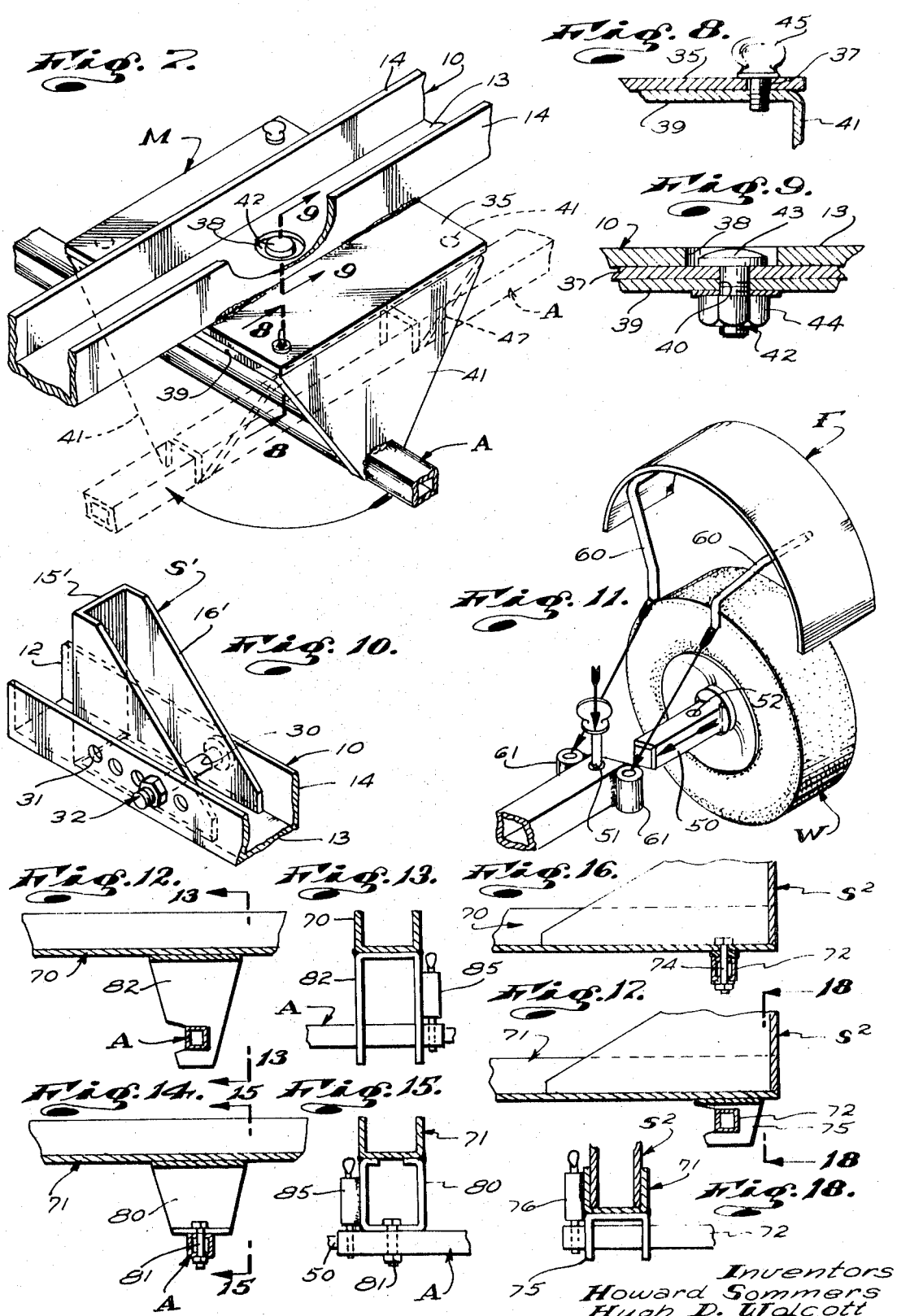

MOTORCYCLE TRAILER

In recent years, there has been a rapid and noticeable increase in the use of motorcycles in "off-the-road" sporting activities, Such activities consist of simple trail riding; that is, riding motorcycles along trails in the open country, hill climbing, cross-country racing and the like.

A great and ever increasing number of persons who engage in such activities do not and will not ride their motorcycle on a street or highway and subject themselves to the hazards and dangers associated therewith. Instead, they transport their motorcycles by means of trailers, towed by trucks or automobiles, to the location where they intend to ride them, and there, mount their cycles and ride them off and away from the road.

In carrying out such a practice, the cyclist enjoys the safety, comfort and often the greater speed of travelling in an automobile or truck while travelling to and from the location or area where he rides his motorcycle.

The above-noted practice has led to the provision and use of trailers for transporting motorcycles, which trailers are adapted to be coupled with and towed behind a truck or automobile.

While the use of standard or conventional trailer constructions for the above purpose has proven to be satisfactory, standard or conventional trailers are wanting in a number of ways.

A conventional trailer construction which would be suitable for transporting motorcycles is a large, heavy rather unsightly construction which must be parked on the street, in a driveway or in a garage, when not in use. Most municipalities have ordinances forbidding the parking of such trailers on the street, and many persons, such as apartment dwellers, have no driveway, yard or ample garage space available in which to park or store such a trailer construction.

As a result of the above, there are a great number of motorcycle enthusiasts who can not own and keep a trailer for their motorcycle or who are greatly inconvenienced by having to arrange for special parking and storage of such trailers when they are not in use.

There are a great number of persons who have been discouraged from undertaking or have been discouraged from continuing such motorcycling activities principly because of the difficulties and inconveniences encountered in storing and keeping a trailer for transporting their motorcycles.

Another factor which makes the use of conventional trailer constructions undesirable for transporting motorcycles to an open and remote location for riding resides in the fact that such trailers, when left by the roadside with a car or truck and unattended, are often pirated of parts and damaged by vandals or are stolen.

While one might leave his truck or automobile along the roadside with relative surety it will not be vandalized or stolen, no such surety exists with respect to a trailer on which motorcycles can be transported. The reasons for this can not be fully explained and is subject to much speculation, but it is clear that at this time, such trailers are particularly susceptable to being pirated of parts and more frequently stolen when left unattended.

An object of our invention is to provide an improved, small, compact, lightweight trailer structure for transporting motorcycles.

Another object of this invention is to provide a trailer construction of the character referred to which is such that it can be easily, quickly and conveniently folded and dismantled, when not in use, for safe, easy and convenient storage in a corner or against the wall of a garage and which is such that when dismantled and folded it can be conveniently and safely stored away in a truck, house trailer, camper or automobile.

Yet another object of our invention is to provide a trailer construction of the character referred to which includes a single, longitudinally extending, central motorcycle-supporting stringer or frame member with front and rear ends, a transversely extending wheel-supporting axle and pivotal mounting means securing the axle to the frame member whereby the axle can be pivoted to extend substantially parallel with the frame member when the trailer is not in use.

Another object of our invention is to provide a trailer construction of the character referred to having novel, vertically adjustable trailer latch mounting means whereby the trailer mounted section or portion of a trailer hitch can be easily and conveniently adjusted to properly trim or orient the trailer relative to the draft vehicle on which the draft vehicle portion or section of the trailer hitch is mounted.

It is an object of our invention to provide a trailer of the character referred to having simple, novel, highly effective and safe motorcycle wheel stop and support means and such a means which is easy and convenient to adjust to accommodate motorcycles with different wheel bases.

A further object of the present invention is to provide a trailer of the character referred to which is of minimum longitudinal extension and which is closely coupled with its related draft vehicle whereby overall length of the draft vehicle and trailer is maintained at a minimum.

It is a further object of our invention to provide a trailer of the character referred to wherein manipulation. supporting wheels are releasably mounted on and with the ends of the wheel axle whereby the wheels can be removed from the construction when it is not in use, for convenient handling and storage and to reduce the weight of the frame and axle assembly for easy and convenient manipulation Still another object our invention is to provide a trailer construction of the character referred to having a pair of elongate laterally spaced, longitudinally extending secondary motorcycle-supporting frame members, at the opposite sides of the central frame member, each adapted to support and carry a motorcycle, whereby the trailer can conveniently support and carry one, two or three motorcycles as desired or as circumstances require.

An object of our invention is to pivotally connect the secondary frame members to the axle and the primary frame member so that when the trailer is not in use, the secondary frame members can be pivoted laterally inwardly into parallel juxtapositon with their related sides of the primary frame member to establish a small, neat, compact, easy to handle and store assembly.

It is an object of the present invention to pivotally mount the secondary frame members so that their forward ends are normally spaced rearward of the forward end of the central frame member and the trailer hitch so as to provide turning clearance between their forward ends and the draft vehicle and so that when the construction is folded the ends of the several frame members are in a common plane, reducing the overall length of the folded assembly for convenient handling and storage.

The foregoing and other objects and features of our invention will be understood and will become apparent from the following detailed description of typical preferred forms and embodiments of the invention, throughout which descriptive reference is made to the accompanying drawings in which:

FIG. 1 is a side elevational view of our new trailer, related to a draft vehicle and supporting a motorcycle;

FIG. 2 is a plan view of our new trailer, taken substantially as indicated by line 2—2 on FIG. 1;

FIG. 3 is a view showing the trailer dismantled, folded and disposed for storage;

FIG. 4 is a side elevational view of our trailer with secondary motorcycle-supporting frame members related thereto;

FIG. 5 is a plan view taken substantially as indicated by line 5—5 on FIG. 4;

FIG. 6 is an isometric view showing the front end and trailer hitch of our new trailer;

FIG. 7 is an isometric view of the central portion of our trailer and illustrating the pivotal connection between the frame and axle;

FIG. 8 is a sectional view taken as indicated by line 8—8 on FIG. 7;

FIG. 9 is a sectional view taken as indicated by line 9—9 on FIG. 7;

FIG. 10 is an isometric view showing the rear wheel stop means that we provide;

FIG. 11 is an exploded isometric view of the wheel, axle and fender assembly that we provide;

FIG. 12 is a view taken substantially as indicated by line 12—12 on FIG. 5;

FIG. 13 is a view taken as indicated by line 13—13 on FIG. 12;

FIG. 14 is a view taken as indicated by line 14—14 on FIG. 5;

FIG. 15 is a view taken as indicated by line 15—15 on FIG. 14;

FIG. 16 is a view taken as indicated by line 16—16 on FIG. 5;

FIG. 17 is a view taken as indicated by line 17—17 on FIG. 5; and

FIG. 18 is a view taken as indicated by line 18—18 in FIG. 17.

The trailer T that we provide includes an elongate, central longitudinally extending frame member 10 with front and rear ends 11 and 12.

The member 10 is established of an upwardly opening channel section having a flat, horizontal bottom 13 and laterally spaced, upwardly projecting sidewalls 14. The bottom 13 establishes a flat, horizontal, upwardly disposed surface along which the wheels of a motorcycle X can be engaged and along which said wheels can roll. The sidewalls 14 are spaced apart laterally a sufficient distance to freely accommodate the tires and wheels of the motorcycle and are of substantial and sufficient vertical extent to guide and to retain the motorcycle wheels when rolled therebetween and supported by bottom 13.

The front end of the frame member 10 is provided with a vertically projecting wheel stop S established by a U-shaped metal part having a flat, vertical front wall 15 extending upwardly from the front end of the bottom 13 on a plane normal to the longitudinal axis of the member 10 having laterally spaced, gussetlike, retaining plates 16, with downwardly and rearwardly inclined top edges, projecting rearwardly from the vertical side edges of the front wall 15 and slidably engaged with the inner surfaces of the sidewalls 14 of the member 10. The wheel stop S is fixed to the member 10 and can be welded, riveted or otherwise fixed thereto.

The wheel stop S is of sufficient lateral and vertical extent to freely receive a lower, forward quadrant portion of a motorcycle wheel and to engage the wheel in such a manner as to stop forward rolling or movement thereof and in such a manner as to hold and maintain the wheel in a vertical plane common with the central longitudinal axis of the frame member, that is, to hold it in such a manner as to prevent the wheel from shifting or being turned laterally.

The front wall 15 is provided with a plurality of vertically spaced fastener-receiving openings 17 throughout its vertical longitudinal extent.

The openings 17 are adapted to facilitate securing a portion of novel hitching means H to the frame member. The hitching means H includes an L-shaped bracket 18 with a flat vertical plate portion 19 to establish flat engagement with the front wall 15 of the wheel stop S and a forwardly projecting, horizontal tongue 20 on which the socket portion 21 of a ball-and-socket type trailer hitch is secured, as clearly illustrated in FIG. 6 of the drawings.

The plate portion 19 is provided with a pair of vertically spaced fastener receiving openings (not shown) to register with selected pairs of the openings 17 in the front wall 15 of the wheel stop S.

Suitable releasable screw fastening means 22 such as nut and bolt assemblies, are engaged in the registering openings in the front wall 15 and plate 19 to releasably secure the hitch means H to the frame member 10.

It is to be noted that the strong, rigid, gussetted wheel stop S is, in effect, an element or part of the hitch means H.

It will be further apparent that the bracket portion 18 of the hitch means H can be adjusted vertically on the wheel stop by engagement of the fastening means 22 in selected openings 17 in the front wall 15 whereby the portion 21 of the hitch means can be engaged with a related ball portion 21' of said means, fixed to a draft vehicle and so that the frame member 10 is in a substantially horizontal plane, regardless of the vertical positioning of the noted ball portion 21'.

It is to be noted that the above-noted means for hitching the trailer to a draft vehicle is quite distinct from conventional means for same purpose, where vertical adjustability is disposed with and variations in vertical positioning of the draft vehicle portion 21' of the hitching means is sought to be compensated for by providing a long and extended tongue at the front end of the trailer frame and extending between the frame and the hitch portion 21' and, if necessary, at an angle to effect anticipated, desired trim and dispositioning of the trailer. Such practice results in excessively long trailers.

With the means that applicant provides, the overall length of the trailer is maintained at a minimum and is closely coupled to and with the draft vehicle.

The rear end portion of the frame member 10 carries and is provided with a rear or secondary wheel support means S', which means includes a U-shaped wheel stop part similar to the front wheel support S, but turned about to define a vertical rear wall 15' and forwardly projecting side plates 16'. The means S' distinguishes from the front wheel stop in that the U-shaped stop part is not fixed to the frame member, but is releasably secured thereto so that it can be easily and conveniently removed to facilitate the rolling engagement of a motorcycle onto the frame member, from the rear end thereof and so that it can be secured to the frame member at different locations, longitudinally thereof, to engage the rear wheels of motorcycles having different wheel bases and the front wheels of which are engaged with the front wheel stop of the trailer, as set forth above.

To the above end, the side plates 16' of the wheel stop part are provided with axially aligned fastener-receiving openings 30, the sidewalls 14 of the frame member 10 are provided with a plurality of longitudinally spaced fastener-receiving openings 31 and a bolt and nut assembly 32 is engaged in and through the openings 30 and through selected registering openings 31 in the frame member, to releasably receive the part to the frame and as clearly illustrated in FIG. 7 of the drawings.

In practice, a motorcycle is advanced onto the frame into stopped engagement with the front wheel stop S. The wheel stop part of means S' is then engaged with the frame member 10 to engage and stop with the rear wheel of the motorcycle, whereupon the fastener means 32 is applied to secure the part to the frame.

The wheel stop part of the means S' engages the wheel related thereto in the same manner as the wheel stop S engages its related wheel.

The trailer that we provide next includes an elongate, horizontal axle tube A and pivotal mounting means M securing the axle to the frame member substantially intermediate the ends thereof in spaced relationship therebelow and for selectively pivoting the axle tube to extend transverse or parallel relative to the longitudinal axis of the frame member.

The axle tube A is a simple length of tubing of predetermined longitudinal extent. In the case illustrated, the tube is square in cross section and has open ends.

The mounting means M includes a flat, horizontal top plate 35 fixed to the bottom of the frame member 10. The plate 35 has a central pivot opening 36 and a pair of lockpin openings 37 spaced radially from the opening 36 and 90° or 180° from each other, circumferentially, relative to the axis of the opening 36.

The plate 35 can be welded, riveted or otherwise fixed to the member 10 as desired or as circumstances require.

The axis of the opening 36 intersects the central longitudinal axis of the frame member 10 and, in the case illustrated, is accessible from the top through an opening 38 in the bottom 13 of the member 10.

The means M next includes a bottom plate 39 similar in configuration with the top plate 35 and provided with a central pivot opening 40 and stop pin openings 41, as is the top plate.

The plate 39 further includes laterally spaced depending struts 41 formed integrally with and depending from opposite sides of the plate. The struts are preferably triangular, converging downwardly toward the transverse central vertical plane of the plate 39 and have their lower ends fixed to the central portion of the axle tube A, as by welding.

In the case illustrated, the lower ends of the struts are provided with axle receiving and orienting notches.

The top and bottom plates 35 and 39 are pivotally connected by means of a pivot means 42, which pin is established by a bolt 43 engaged through the openings 36 and 40 and retained in engagement therein by a suitable nut 44.

With the plates thus connected, it will be apparent that the axle can be pivoted from a normal position when the longitudinal axis is normal to the longitudinal axis of the frame member as shown in FIGS. 2 and 8, to a folded position where the axis of the axle and member 10 are parallel, as shown in FIG. 3 and in dotted lines in FIG. 8 of the drawings.

When the plates are in their normal position the openings 37 and 41 are in register and lockpins 45 are engaged therethrough. In our preferred carrying out of the invention, the lockpins 45 are in the nature of wing bolts or similar screw fasteners freely engaged through the openings 37 and threaded in the openings 41 to hold the plates tight together as well as to stop or prevent relative rotation thereof.

It will be apparent that upon removal of the pins 45, the axle can be rotated to its folded or actuated position.

In practice, the plate 39 can be provided with a second set of openings 41, spaced to secure the pins 45 when the structure is in its folded condition and so that it is held in that condition and so that the pins need not be left about as loose parts subject to being lost.

The trailer construction next includes a pair of wheel assemblies, adapted to be related to the opposite ends of the axle A.

Each wheel assembly, as shown in FIG. 11, includes a pneumatic wheel and tire assembly W, rotatably carried by a stub-axle 50. The axle and wheel assembly is connected with a suitable antifriction bearing means (not shown) in accordance with common practice.

The stub-axles 50 correspond in outside cross-sectional configuration with the inside cross-sectional configuration of the axle A and are normally slidably engaged in their related, opposite ends of the axle.

The axle A and the stub-axles 50 are provided with retaining pin-receiving openings 51 and 52 which register with each other when the construction is assembled in and through which suitable retaining pins 53 are engaged.

The pin 53 can be of any suitable form. For example, they can be wing bolts; similar to the lock bolts 45 and thread in and with the axles and/or stub-axles to assure their retention.

When the construction is not in use and the axle A and frame member 10 are to be folded and stored, the wheel assemblies are moved from engagement with the axle for independent handling and so as to remove their weight from the frame and axle assembly to make handling and manipulation thereof easy and convenient.

Finally, in the preferred carrying out of our invention, the trailer construction includes mud shields or fenders F for the wheel assemblies which fenders are simple curved metal sheets adapted to overly and extend about the top portions of the wheel assemblies in spaced relationship therewith.

The fenders F have spaced, inwardly and downwardly extending support rods 60 fixed thereto. The rods 60 have laterally spaced, vertical, pin portions at their lower ends which pin portions are removably and slidably engaged in a pair of laterally spaced, vertical, open-ended receiver tubes 61 fixed to the opposite sides of the axle A, at the ends of the axle.

It will be apparent that the fenders F can be easily and conveniently removed from engagement with the axle A and from about their related wheel assemblies for separate handling and storage and to remove their weight from the wheel assemblies and/or the axle and frame member assembly, to facilitate easy and convenient handling and storage of the construction.

The trailer construction thus far described is our basic trailer and is suitable for supporting and transporting one motorcycle.

In practice, when it is desired to support and transport two or three motorcycles, we provide a pair of secondary frame members 70 and 71 similar to the frame member 10 and including front wheel stops $S^2$ and rear wheel stop means $S^3$ similar to the wheel stop S and wheel stop means S' related to the frame member 10.

The secondary frame member 70 normally occurs in lateral-spaced parallel relationship to or with one side of the member 10 and the member 71 normally occurs in similar relationship with the other side of the member 10.

The several members 10, 70 and 71 are equal in longitudinal extent and are normally arranged so that the front and rear ends of the secondary members 70 and 71 occur in predetermined spaced relationship rearward of the front and rear ends of the member 10, as shown in FIGS. 4 and 5 of the drawings.

When the members 70 and 71 are to be employed, we provide an elongate normally transversely extending support arm 72 pivotally connected at its center to the forward portion of the member 10 as at 73 and having its end portions related to the forward ends of the members 70 and 71.

The forward end of the member 70 is pivotally connected to the end of the arm 72 related thereto by pivot means 74 as shown in FIGS. 5 and 16 of the drawings and with means similar to those means employed to pivot the arm to the member 10.

The forward end of the member 71 is releasably connected with its related end of the arm 72 by means of a rearwardly opening hook means or bracket 75 fixed to the under side of the member 71, at its forward end and as shown in FIGS. 17 and 18 of the drawings. The hook means 75 limits and stops forward movement of the end of the arm 72 related to the member 71 relative to said member and holds that end of the arm and the member against relative vertical movement or displacement. The hook means 75 will, however, allow for rearward movement and swinging of the arm relative to the member 71.

The ends of the arm 72 project, a limited distance, laterally outwardly and beyond the outer sides of the members 70 and 71 and are provided with vertical openings in which spring-loaded keeper pins 76 carried by the members 70 and 71 are normally and releasably engaged. The pins 76 normally hold the arm 72 and members 10, 70 and 71 in their normal position and prevent pivoting and shifting of said parts relative to each other. When said pins are disengaged from the arm, the parts are free to shift and pivot relative to each other.

The secondary member 71 is pivotally connected with and to the end portion of the axle A, which occurs below it, by means of a strutlike support 80 fixed to and depending from the member 71 and pivot pin means 81 as shown in FIGS. 14 and 15 of the drawings.

The member 70 is releasably connected with the end of the axle A related to it by means of a rearwardly opening hook means or bracket 82 fixed to the underside and depending from the member 70, at its central portion, as shown in FIGS. 12 and 13 of the drawings.

The hook means 82 limits and stops forward movement of the end of the axle A related to the member 70 against relative vertical movement or displacement. The hook means 82 will, however, allow for rearward movement and swinging of the axle relative to the member 70.

When the members 70 and 71 are employed, the retaining pins 53 employed to secure the stub-axles 50 to the axle A are disposed of and spring loaded or similar type retaining pins 85 carried by the members 70 and 71, or the support and bracket, 80 and 82, are provided which pins, in addition to securing the axle A and stub-axles 50 together, also lock the support 80 and bracket 82 to axle A and prevent relative movement and displacement of the axle, bracket and support.

The pin means 85 and 76 related to the hook means or brackets 75 and 82 serve to releasably retain the arm 72 and axle A in the hook means.

The bracket 80 and 82 are of sufficient vertical extent so that the several members 10, 70 and 71 occur in a common horizontal plane.

When it is desired to fold the construction for storage and the like, the wheel assemblies and fenders are first removed, whereupon the pin means 76 and 85 are released. Upon release of the pin means, the members 70 and 71 are urged forwardly and laterally inwardly toward the member 10. This movement causes the ends of the axle A and arm 72 related to the hook means 75 and 82 to swing rearwardly out of engagement with said means and relative to the several members and until said members, axle and arms reach that folded position shown in dotted lines in FIGS. 4 and 5 of the drawings, where said members are in juxtapositon and their forward ends are in a common transverse plane.

With the construction thus dismantled and folded, the assembly of members 10, 70, 71, axle A and arm 72 is a neat compact, easy to handle and manipulate assembly, capable of being conveniently stored in an automobile, truck, trailer or in any other desirable location where minimum space is available.

In practice, the trailer that we provide can be made of steel, aluminum or a combination of steel and aluminum parts and components with due consideration being given to weight and strength and to the means by which related parts are to be secured and related one to the other.

Having described only one form and carrying out of our invention, we do not wish to be limited to the specific details set forth above, but wish to reserve to ourselves any variation and/or modification that fall within the scope of the following claims.

I claim:

1. A motorcycle trailer comprising an elongate central frame member defined by an elongate, central longitudinally extending upwardly opening channel section having front and rear ends, a flat horizontal wheel-supporting bottom and laterally spaced vertical wheel guiding and retaining sidewalls, front wheel stop means at the front end of the frame member defining an upwardly projecting front wall and laterally spaced retaining plates extending rearwardly and downwardly from the front wall to the sidewalls of the frame member and adapted to engage the lower forward quadrant of the front wheel of a motorcycle; rear wheel stop means at the rear end of the frame member including a stop part with a vertical rear wall projecting upwardly from the frame member and laterally spaced retaining plates extending forwardly and downwardly form the rear wall to the frame member and adapted to engage the lower rear quadrant of the rear wheel of a motorcycle means releasably receiving the stop part to the frame member, trailer hitch means fixed to the front wall and projecting forwardly therefrom, an elongate tubular axle, wheel assemblies at the opposite ends of the axle, mounting means pivotally securing the center of the axle to the central portion of the frame member and including a top plate fixed to the bottom of the frame member, a bottom plate secured to the central portion of the axle, central, vertical pivot means pivotally securing the top and bottom plates together on an axis intersecting the central axis of the frame member, and lockpins engaged in and through registering openings in the top and bottom plates spaced radially of the central, vertical pivot means to releasably lock the plates together with the axis of the axle normal to the axis of the frame member, said axle adapted to be pivoted to extend parallel below the frame member when the trailer is not in use and said lockpins are disengaged from their related plates.

2. A trailer as set forth in claim 1 wherein said trailer hitch means includes a plurality of vertically spaced openings in said front wall, a vertical plate with a pair of openings in register with selected pairs of said vertically spaced openings, screw fastening means engaged in and through said registering openings, a forwardly projecting tongue on said plate and a trailer-related portion of a trailer hitch means fixed to and carried by said tongue.

3. A trailer as set forth in claim 1 wherein said means releasably receiving the stop part to the frame member includes a plurality of longitudinally spaced openings in the sidewalls of the frame member, openings in the plates of the stop part and in register with selected openings in the frame member and screw fastening means releasably engaged in and through the registering openings.

4. A trailer as set forth in claim 1 wherein said trailer hitch means includes a plurality of vertically spaced openings in said front wall, a vertical plate with a pair of openings in register with selected pairs of said vertically spaced openings, screw fastening means engaged in and through said registering openings, a forwardly projecting tongue on said plate and a trailer related portion of a trailer hitch means fixed to and carried by said tongue, said means releasably receiving the stop part to the frame member includes a plurality of longitudinally spaced openings in the sidewalls of the frame member, openings in the plates of the stop part and in register with selected openings in the frame member and screw fastening means releasably engaged in and through the registering openings.

5. A trailer as set forth in claim 1 wherein said wheel assemblies include pneumatic tire and wheel assemblies rotatably carried by stub-axles, said stub-axles slidably engaged in their related ends of the axle and retaining pins engaged through registering openings in the axle and stub-axles.

6. A trailer as set forth in claim 1 wherein said trailer hitch means includes a plurality of vertically spaced openings in said front wall, a vertical plate with a pair of openings in register with selected pairs of said vertically spaced openings, screw fastening means engaged in and through said registering openings, a forwardly projecting tongue on said plate and a trailer related portion of a trailer hitch means fixed to and carried by said tongue, said means releasably receiving the stop part to the frame member includes a plurality of longitudinally spaced openings in the sidewalls of the frame member, openings in the plates of the stop part and in register with selected openings in the frame member and screw fastening means releasably engaged in and through the registering openings, said wheel assemblies include pneumatic tire and wheel assemblies rotatably carried by stub-axles, said stub-axles slidably engaged in their related ends of the axle and retaining pins engaged through registering openings in the axle and stub-axles.

7. A structure as set forth in claim 1 and further including first and second secondary frame members similar to said central frame member, with front wheel stop means and rear wheel stop means similar to the wheel stop means on the central frame member and spaced laterally from a parallel with the opposite sides of the central frame member with their front ends spaced rearward from the front end of the central frame member, an elongate transversely extending arm pivoted to the central frame member forward of the axle, means pivoting one end of the arm to the forward end portion of the first secondary frame member, means pivoting the other secondary frame member to the axle, means releasably connecting the first secondary frame member to the axle and means releasably connecting the other secondary frame member to the other end of the arm, said secondary frame members adapted to move laterally inwardly and forwardly into juxtaposition with their related sides of the central frame member when said means releasably connecting them with the axle and arm are released.

8. A trailer as set forth in claim 1 wherein said means releasably receiving the stop part to the frame member includes a plurality of longitudinally spaced openings in the sidewalls of the frame member, openings in the plates of the stop part and in register with selected openings in the frame member and screw fastening means releasably engaged in and through the registering openings, including first and second secondary frame members similar to said central frame member, with front wheel stop means and rear wheel stop means similar to the wheel stop means on the central frame member and spaced laterally from a parallel with the opposite sides of the central frame member with their front ends spaced rearward from the front end of the central frame member, an elongate transversely extending arm pivoted to the central frame member forward of the axle, means pivoting one end of the arm to the forward end portion of the first secondary frame member, means pivoting the other secondary frame member to the axle, means releasably connecting the first secondary frame member to the axle and means releasably connecting the other secondary frame member to the other end of the arm, said secondary frame members adapted to move laterally inwardly and forwardly into juxtaposition with their related sides of the central frame member when said means releasably connecting them with the axle and arm are released.

9. A trailer as set forth in claim 1 wherein said trailer hitch means includes a plurality of vertically spaced openings in said front wall, a vertical plate with a pair of openings in register with selected pairs of said vertically spaced openings, screw fastening means engaged in and through said registering openings, a forwardly projecting tongue on said plate and a trailer related portion of a trailer hitch means fixed to and carried by said tongue, said means releasably receiving the stop part of the frame member includes a plurality of longitudinally spaced openings in the sidewalls of the frame member, openings in the plates of the stop part and in register with selected openings in the frame member and screw fastening means releasably engaged in and through the registering openings, and further including first and second secondary frame members similar to said central frame member, with front wheel stop means and rear wheel stop means similar to the wheel stop means on the central frame member and spaced laterally from a parallel with the opposite sides of the central frame member with their front ends spaced rearward from the front end of the central frame member, an elongate transversely extending arm pivoted to the central frame member forward of the axle, means pivoting one end of the arm to the forward end portion of the first secondary frame member, means pivoting the other secondary frame member to the axle, means releasably connecting the first secondary frame member to the axle and means releasably connecting the other secondary frame member to the other end of the arm, said secondary frame members adapted to move laterally inwardly and forwardly into juxtaposition with their related sides of the central frame member when said means releasably connecting them with the axle and arm are released.

10. A trailer as set forth in claim 1 wherein said wheel assemblies include pneumatic tire and wheel assemblies rotatably carried by stub-axles, said stub-axles slidably engaged in their related ends of the axle and retaining pins engaged through registering opening in the axle and stub-axles, and further including first and secondary frame members similar to said central frame member, with front wheel stop means and rear wheel stop means similar to the wheel stop means on the central frame member and spaced laterally from a parallel with the opposite sides of the central fame member with their front ends spaced rearward from the front end of the central frame member, an elongate transversely extending arm pivoted to the central frame member forward of the axle, means pivoting one end of the arm to the forward end portion of the first secondary frame member, means pivoting the other member, means pivoting the other secondary frame member to the axle, means releasably connecting the other secondary frame member to the other end of the arm, said secondary frame members adapted to move laterally inwardly and forwardly into juxtaposition with their related sides of the central frame member when said means releasably connecting them with the axle and arm are released.

* * * * *